United States Patent [19]
Dory et al.

[11] Patent Number: 5,249,460
[45] Date of Patent: Oct. 5, 1993

[54] METHOD AND APPARATUS FOR MEASURING IRREGULAR TREAD WEAR

[75] Inventors: Arthur J. Dory, Akron; Stephen M. Vossberg, Uniontown; John G. Lightner, III, Hartville, all of Ohio

[73] Assignee: Bridgestone Corporation, Tokyo, Japan

[21] Appl. No.: 807,691

[22] Filed: Dec. 16, 1991

[51] Int. Cl.⁵ .................... B60C 11/00; G01M 17/02
[52] U.S. Cl. ........................................ 73/146; 356/431
[58] Field of Search .............. 73/146; 356/4, 167, 356/156, 429, 430, 431

[56] References Cited

U.S. PATENT DOCUMENTS

| | | | |
|---|---|---|---|
| 3,918,816 | 11/1975 | Foster et al. | 73/146 |
| 4,095,464 | 6/1978 | Breedijk | 73/146 |
| 4,150,567 | 4/1979 | Prevorsek et al. | 73/146 |
| 4,225,238 | 9/1980 | Rottenkolber | 356/348 |
| 4,275,589 | 6/1981 | Dugger et al. | 73/146 |
| 4,311,044 | 1/1982 | Marshall et al. | 73/146 |
| 4,402,218 | 9/1983 | Engel | 73/146 |
| 4,440,018 | 4/1984 | Christie | 73/146 |
| 4,469,450 | 9/1984 | DiVincenzo | 374/119 |
| 4,653,316 | 3/1987 | Fukuhara | 73/146 |
| 4,670,289 | 6/1987 | Miller, III | 427/8 |
| 4,837,980 | 6/1989 | Rogers, Jr. | 51/165 R |
| 4,841,766 | 6/1989 | Haack | 73/146 |
| 4,907,447 | 3/1990 | Tanaka et al. | 73/146 |
| 4,918,976 | 4/1990 | Fogal, Sr. | 73/146 |
| 4,934,184 | 6/1990 | Tsuji | 73/146 |
| 4,936,138 | 6/1990 | Cushman et al. | 73/146 |
| 4,969,355 | 11/1990 | Doi et al. | 73/146 |
| 5,088,321 | 2/1992 | Kajikawa et al. | 73/146 |

*Primary Examiner*—Donald O. Woodiel
*Attorney, Agent, or Firm*—David A. Thomas

[57] ABSTRACT

An apparatus and technique for measuring and analyzing the tread wear of a pneumatic tire. The tire is indexed about its axis. Between the indexing steps, a laser scanner obtains data from the tread surface. This data is normalized to eliminate any out-of-roundness of the tire data. Noise spikes are removed and replaced with values attributable to valid data. From the data, a reference curve corresponding to a lateral sector of the tire is devised. The data from actual lateral sectors is then compared to the reference curve by a curve-fitting process and the deviation between the actual data and the reference curve establishes the degree of irregular wear of the tire at that lateral point.

18 Claims, 3 Drawing Sheets

METHOD AND APPARATUS FOR MEASURING IRREGULAR TREAD WEAR

TECHNICAL FIELD

The invention herein resides in the art of apparatus and techniques for measuring and analyzing the tread wear of a pneumatic tire. Specifically, the invention relates to such an apparatus and technique which employs a noncontact probe to acquire data from the tread surface, such data being arranged in a data matrix for subsequent analysis as to tread wear characteristics.

BACKGROUND OF THE INVENTION

The current state of art of irregular tire tread wear evaluation is substantially subjective. Those persons involved in evaluating irregular tire tread wear must see, and frequently touch, the actual tire under consideration in order to formulate a conclusion as to the causes of such irregular tire tread wear. Such techniques have rendered it virtually impossible to archive or otherwise maintain the data respecting the tires considered, for such data has, in large part, been nothing more than the mental process undertaken by the individual evaluating the tire. In the past, data respecting such tread wear has been stored by actual retention of the tire itself or, at least, portions thereof.

Additionally, the prior art techniques for evaluating irregular tire tread wear have made it extremely difficult to make accurate comparisons of tread wear from one tire to another, particularly when the differences in tread wear between the tires are extremely small. Additionally, there is a lack of both accuracy and consistency in unaided human perceptions as to the subjectivity of irregular tire wear evaluation.

There is a need in the art for a method and apparatus for measuring irregular tread wear which is capable of high resolution, accuracy, and repeatability.

DISCLOSURE OF INVENTION

In light of the foregoing, it is a first aspect of the invention to provide a method and apparatus for measuring irregular tread wear in a pneumatic tire which eliminates subjectivity in the wear evaluation, permitting accurate quantification of irregular wear.

Still another aspect of the invention is the provision of a method and apparatus for measuring irregular tread wear in a pneumatic tire which eliminates the need to archive or store the actual tire or portions thereof for the purpose of irregular wear evaluation, allowing for ease of comparison among irregularly worn tires.

Another aspect of the invention is the provision of a method and apparatus for measuring irregular tread wear which accentuates irregular wear through a computer aided display, making such wear easily detectable even when relatively small.

Yet a further aspect of the invention is the provision of a method and apparatus for measuring irregular tread wear in which discrete data points in the form of a matrix covering the totality of the tread wear surface are generated, allowing for an accurate and rapid overview of the totality of the tread wear surface, further allowing for comparisons of one portion of the surface to others during the analysis process.

The foregoing and other aspects of the invention which will become apparent as the detailed description proceeds are achieved by apparatus for measuring and analyzing the tread wear of a pneumatic tire, comprising: first means for receiving and rotating a tire about the axis of rotation of the tire; second means adjacent the tire for scanning a field of view including a tread surface of the tire and obtaining data from said field of view; and control means interconnected between said first and second means for controlling said rotation of the tire and controlling said scanning of said field of view.

Additional aspects of the invention are attained by a method for measuring and analyzing the tread wear of a pneumatic tire, comprising: indexing the tire about an axis; scanning a data field including the tire and obtaining data from discrete data points within said data field; determining those data points defining a tread surface of the tire, said data points defining a matrix of circumferentially and laterally aligned sets of data points; and removing a first harmonic from said matrix of data points, compensating for possible out-of-roundness of the tire and/or rim.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
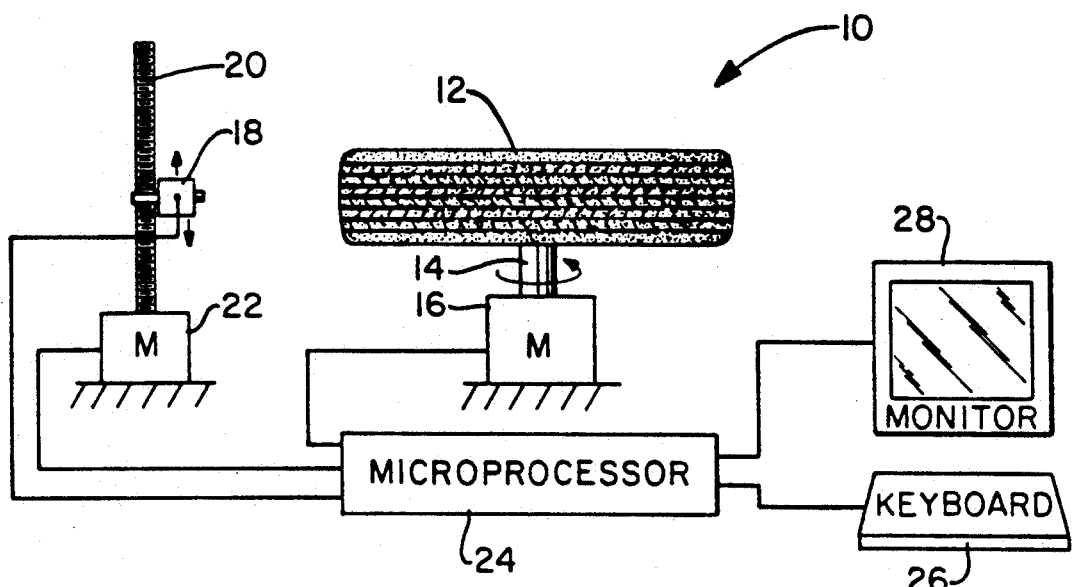
FIG. 1 is a schematic block diagram of the apparatus of the invention.

Referring now to the drawings and more particularly FIG. 1, it can be seen that a system for measuring the tread wear of a pneumatic tire according to the invention is designated generally by the numeral 10. As shown, a pneumatic tire 12 is horizontally mounted upon a rim or wheel attached to an axle 14 which is caused to rotate by means of an appropriate stepper motor 16 or other suitable controllable rotational device.

Positioned adjacent the tire 12 is an appropriate data probe 18. In the preferred embodiment of the invention, the data probe 18 is of the noncontacting type such a laser probe, sonic probe, or other similar device. While it is possible to use contacting probes within the context of the invention, it has been found that the noncontacting laser probes are best suited for the instant application. Those skilled in the art will readily understand that a laser probe comprises a source of laser light and a receiver for such light as is reflected from a surface upon which it is impinged. The probe determines from the reflected light the distance between the probe and the reflective surface. According to the instant invention, the sensor of the probe 18 receives light reflected back from the tread surface of the tire 12.

The data probe 18 is mounted upon a screw gear 20 or appropriate slider table such as to move parallel to the axle 14 and orthogonally with respect to the tread of the tire 12. The screw gear 20 is rotated by means of an appropriate stepper motor 22 to urge the data probe to move upwardly and downwardly thereon, dependent upon the direction of rotation of the motor 22 and screw gear 20. Accordingly, it will be appreciated that the probe 18, under control of the motor 22, can laterally traverse the tread of the tire 12.

With continued reference to FIG. 1, it can be seen that an appropriate processing unit such as a microprocessor 24 is provided as the primary control unit of the measurement system 10. Associated with the processor 24 is a keyboard 26 to allow operator communication with the processor 24. Additionally, an appropriate display screen 28 is also provided in interconnection with the microprocessor 24 to display communication, data, and the like.

As shown, the microprocessor 24 is interconnected with the stepper motors 16, 22 and the data probe 18. It will be appreciated that the microprocessor 24 controls stepper motor 16 to index the rotation of the tire 12 upon the axle 14. In the preferred embodiment of the invention, the processor 24 causes the motor 16 to index the tire 12 a fixed amount on each actuation. In one embodiment of the invention, stepper motor 16 indexes the tire 12 one degree upon each actuation, such that indexing of the motor 16 three hundred sixty (360) times achieves a full rotation of the tire 12. Greater or lesser rotational degrees on each indexing may be entertained, depending upon the degree of resolution of the circumferential data to be obtained from the tire 12.

As also shown in FIG. 1, the microprocessor 12 controls the stepper motor 22 for control of the rotation of the worm gear 20. In the preferred embodiment of the invention, processor 24 causes the motor 22 to rotate at a fixed speed such that the probe 18 moves at a fixed speed downwardly and upwardly upon the screw gear 20 as the probe 18 scans a data field including the tread surface of the tire 12. The microprocessor 24 activates and deactivates the data probe 18 to obtain data from the data field as the probe 18 moves upon the screw gear 20. The probe 18 is activated as it scans down laterally across the tread of the tire 12, obtaining reflected data back from the tread surface. Upon reaching the bottom of its scan, the processor 24 causes the motor 16 to index the tire 12 a fixed amount. At such time, the motor 22 reverses to cause the probe 18 to move upwardly on the screw gear 20, again laterally scanning the tread surface of the tire 12 and obtaining data therefrom as it moves.

In the preferred embodiment of the invention, the laser data probe 18 scans at a sample rate of 8 kHz, obtaining 8,000 data points per second. Since the velocity of movement of the probe 18 is known and fixed, the spacing of the data points obtained by the probe 18 is readily determined. It has been found that the high resolution of an 8 kHz sample rate is unnecessary for the monitoring of the tread surface of the tire 12 and, accordingly, the data points are grouped in groups of fifty, with each group of fifty being treated as a separate and individual data point. The average value of the fifty data points is attributed to this single data point. In practice, grouping the actual data points in groups of fifty and treating them as a single data point provides for a data point along each 0.025 inch of the lateral or radial tread surface. It will be appreciated that the actual data obtained by the data probe 18 is passed through the microprocessor 24 or other suitable data accumulation device. This raw data is grouped into the groups of fifty just described by means of the processor 24.

Figure 2:
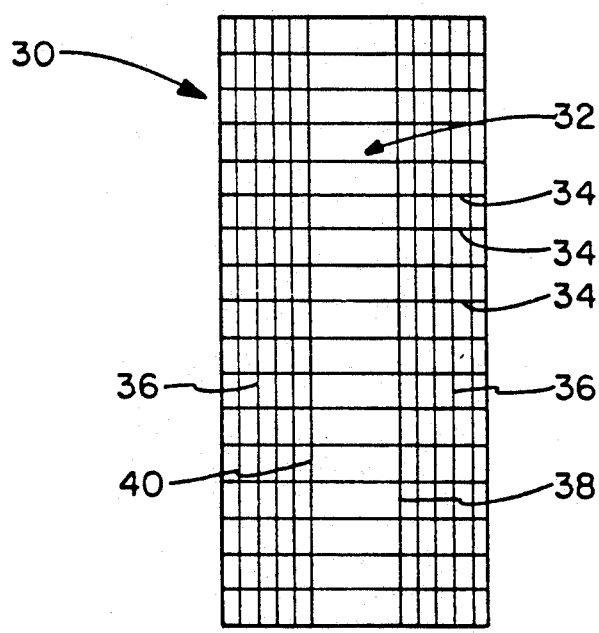
FIG. 2 is an illustrative view of the data field including the treadwear surface of a tire obtained from the apparatus of FIG. 1.

With reference now to FIG. 2, it can be seen that the data field obtained by means of the laser probe 18 is designated generally by the numeral 30. The data field 30 includes the tire tread surface 32 which constitutes the entire tread surface of the tire 12 obtained after a complete revolution of the tire 12 by means of the motor 16, during which repeated uniformly spaced scans of the probe 18 are undertaken. As shown in FIG. 2, a plurality of lateral scan lines 34, radial with respect to the tire 12, contain a plurality of data points aligned with the similar data points of each of the other lateral scan lines 34. These aligned data points, comprising the average value of groups of fifty raw data points, are circumferentially aligned along the circumferential lines 36 which run parallel to the edges or shoulders 38, 40 of the tire 12. Accordingly, the data within the data field 30 can be viewed as comprising both lateral sets of data along the lines 34, and circumferential sets of data along the lines 36. Those skilled in the art will readily appreciate that such data points exist at the uniformly spaced intersections of a data matrix. It will also be appreciated by those skilled in the art that the data of interest is that data lying within the data matrix between the tire edges 38, 40.

Figure 3A:
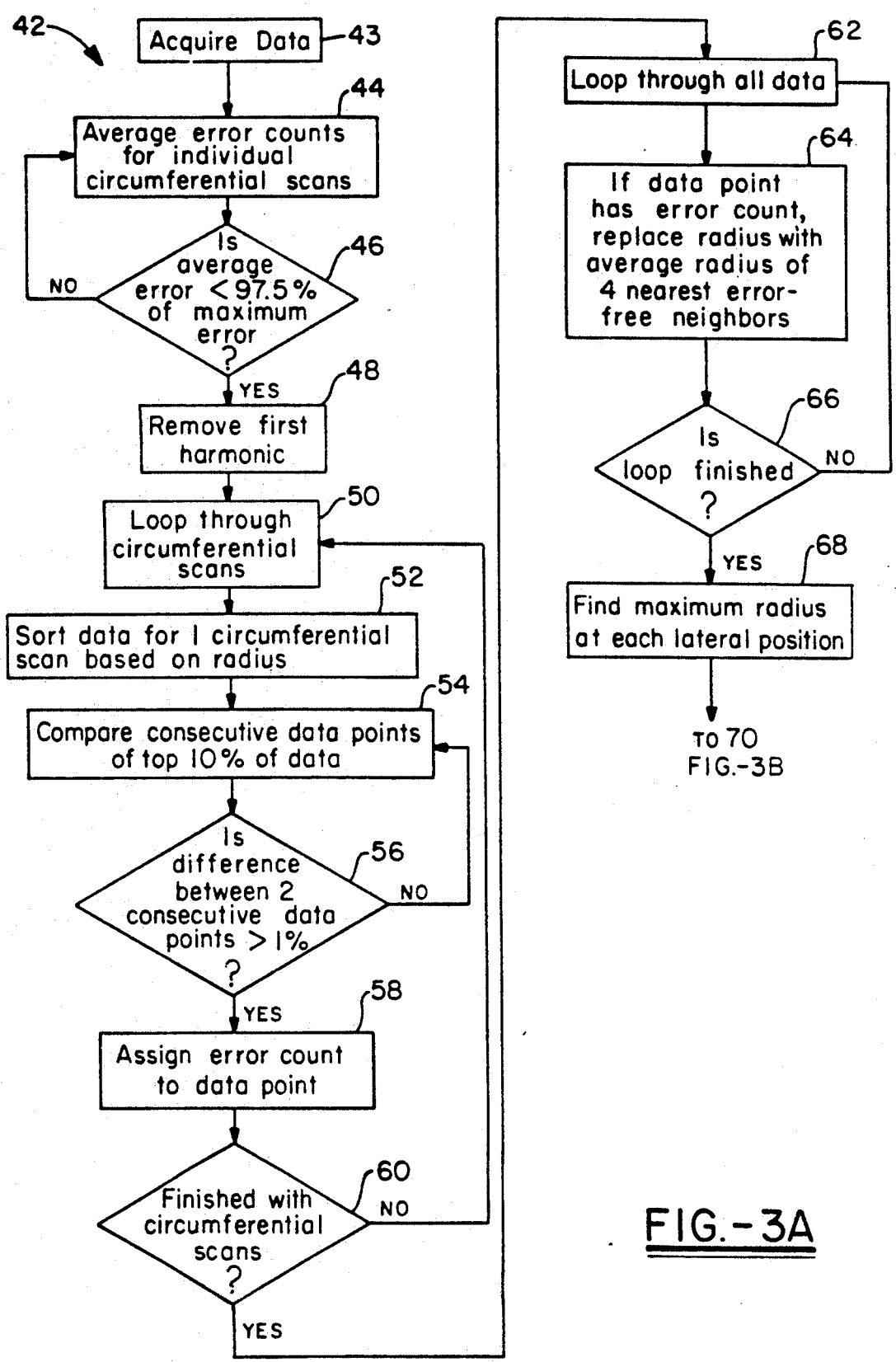
FIGS. 3A and 3B comprise a flow chart of the method of the invention practiced by the apparatus of FIG. 1.
Figure 3B:
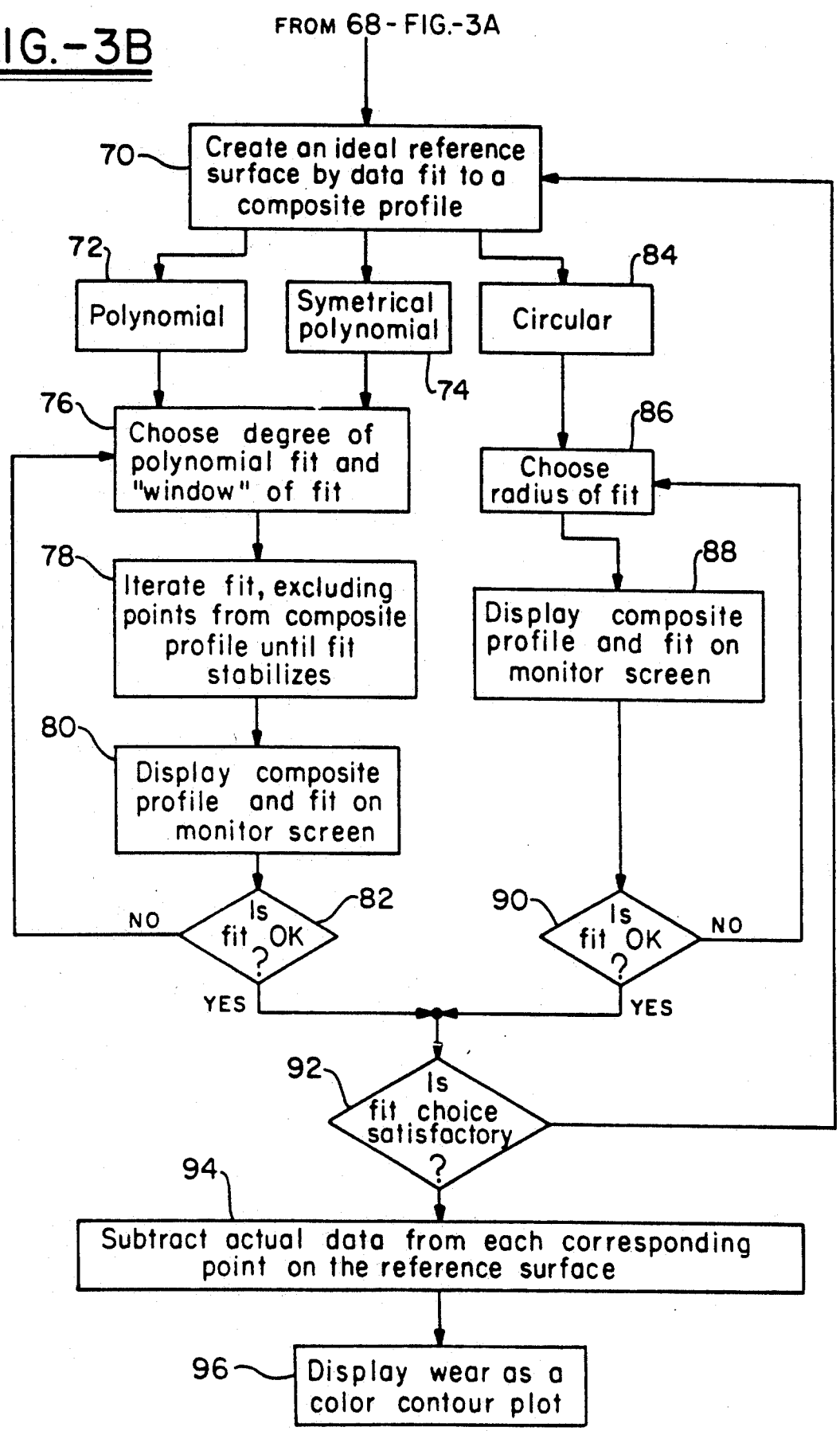

With reference now to FIGS. 3A and 3B the flow chart employed by the microprocessor 24 for analyzing and treating the data acquired from the data probe 18 can be seen as designated generally by the numeral 42. As shown, the first step in the procedure is the acquisition of data at 43, as undertaken by the indexing of the tire 12 by the motor 16 and the scanning of the data field by the probe 18 under control of the motor 22. Those skilled in the art will understand that the data represents the distance of a reflective surface from the probe 18. The reflective surface within the data field of interest is the tire 12. Accordingly, when the laser beam from the probe 18 strikes the tire 12, that light will be reflected back to the sensor of the probe 18, generating data indicative of the distance from the probe 18 to the tire 12. This distance correlates to a radial measurement of the tire 12. Associated with each of the raw data points is a value indicating the distance from the reflective surface to the probe, and an error flag indicating whether that data is within a valid data range or not. With the scan commencing at a point where no reflection is made from the surface of the tire 12, the initial data points are flagged as invalid. As the laser beam of the probe 18 comes into contact with the surface of the tire 12, valid data points are generated. Recalling that each actual data point will consist of fifty raw data points, it will be appreciated that the errors associated with each actual data point can lie anywhere from zero to fifty. In the technique of the invention, any actual data point having an error flag is treated as erroneous data and such data point is given an error flag.

After all of the raw data points have been assembled in groups of fifty as actual data points, and attributed appropriate error flags as required, a process is undertaken to determine the location of the lateral edges 38, 40 of the tire tread 32. To do this, the error counts for the data points on the outermost circumferential lines 36 are averaged as at 44. If the average error count is found to be greater than a set threshold, it is determined that such circumferential data line 36 does not lie upon the tread surface 32 and the next circumferential data line 36 is similarly tested. Such testing continues as at 46 until the two outermost circumferential data lines 36 satisfying the error threshold level are found. The circumferential data lines 36 are then used to define the tire edges 38, 40 and only data lying upon or between these boundaries is then further considered.

It will now be appreciated that a data matrix corresponding to the data point upon the tire tread surface 32 has been defined. The first harmonic of the tire tread surface, corresponding to out-of-roundness of the tire and/or rim, can now be obtained from the tire tread data points and be removed for further analysis of the data. To do this, each of the circumferential data lines 36 within the confines of the tire tread 32 is analyzed separately. A Fourier transform analysis is then undertaken to determine the first harmonic of that data line. This value is then subtracted from all data points on that data line 36. The process is repeated for all similar circumferential data lines 36 upon the tread surface as at 48. Accordingly, the data matrix of the tire surface has thus been normalized or compensated for out-of-roundness of the tire. Such compensation is made since tread wear is analyzed independently of tire and/or rim out-of-roundness.

Next, the process seeks to remove noise spikes or other extraneous errors which might have appeared in the data matrix of the tread surface 32. To do this, it again groups the data points of the matrix according to the circumferential data line 36 upon which the data points lie. The data on each of the circumferential lines 36 is then scanned and, for each circumferential scan, data is sorted based on its distance from the laser probe 18. The ten percent of the data points having the greatest radial value are considered on each circumferential scan. Considering these ten percent of the data points, those data points which differ from adjacent circumferential data points by more than a set percentage are treated as noise spikes and flagged with an error count as indicating erroneous data. This process is continued through the steps 50-60 as shown in FIG. 3A until all of the circumferential data lines 36 have been treated. At such point, the data matrix within the confines of the tread surface 32 will include data points having error flags associated therewith to identify the data as noise.

The program and process of FIGS. 3A and 3B then proceeds to correct the noise spikes by assigning to those data points values of data determined from the values of adjacent data points. In other words, a projection is made as to the actual value of the data points attributed as being erroneous. To do this, all of the data points are analyzed as at 62. Any data point having an error flag associated therewith is then replaced with the average data value of its four nearest error free neighbors, considering those neighbors which are both laterally and circumferentially displaced therefrom. This process, designated by the numerals 62-66, continues until all such erroneous data points have been treated and the values thereof have been replaced with the average value of the four nearest error free neighboring data points.

The data matrix within the tread surface 32 now comprises error-free data points having values correlated to the distance of the data point on the tread surface 32 from the data probe 18. Accordingly, each such data point represents the radial value of the tire tread surface at that point. The program 42 then seeks to determine, for each of the circumferential data lines 36, the maximum radius of the tread surface 32 for that data line. In other words, each of the data points upon each of the circumferential data lines 36 is analyzed and, for each such circumferential data line 36, the value of the maximum data point is determined.

This process, undertaken as at 68, creates a single composite lateral tire profile consisting of the maximum radial value from each circumferential data line 36. This single composite lateral tire profile is then treated as at 70 to generate an ideal reference surface against which all of the data points for each of the lateral data lines 34 are compared. In other words, the maximum data point from each of the circumferential data lines 36 is used to establish a single composite lateral tire profile to which a reference surface is fitted. The deviation of the radii of the actual data points from the radii of the reference surface data points at each lateral data line 34 can be used to determine irregularities of tread wear along that lateral or radial data line.

With the reference surface generated at 70, various types of comparisons, well known and understood by those skilled in the art, can be undertaken. A polynomial analysis may be undertaken as at 72, or a symmetrical polynomial analysis may be undertaken as at 74. Those skilled in the art will appreciate that large degrees of irregular wear can be determined by the symmetrical polynomial analysis as at 74, while smaller irregular wear deviations may be determined by using the polynomial analysis as at 72. In either event, the actual data points for each of the lateral data lines 34 lying upon the tread surface 32 define a profile which is compared to the curve established as the reference. The degree of curve fitting needed in the steps 76, 78 is determined by the shape of the single composite lateral tire profile. The actual curve fitting is displayed upon the screen 28 as at 80 and a determination is made by the operator as at 82 as to the whether the curve fit appears appropriate or not. The operator may then select, as at 76, a different "window" of fit to be employed, such "window" determining a threshold of data to be discarded during the curve fitting process.

As also shown, a purely circular reference could be used rather than a reference generated as at 68, 70. If a purely circular reference is employed as at 84, the operator chooses a radius of fit as shown at 86, which is compared to the single composite lateral tire profile, as shown at 88. A display of the fit is presented on the screen 28 as at 88 and the determination is made at 90 as to whether or not the fit appears appropriate. If not, a different radius fit may be selected as at 86 and the process is repeated.

In each of the analyses employed, the operator makes a determination as at 92 as to whether the curve fit of the single composite lateral tire profile is satisfactory. If not, a new reference may be generated and the fitting process is reiterated. If the operator is satisfied with the fit, then the actual data along each of the lateral data lines 34 may be subtracted from the corresponding point on the reference surface as at 94, such difference corresponding to tread wear. This tread wear may then be displayed as at 96 upon the screen 28. It is contemplated that a color display may be employed to readily discern different types and degrees of tread wear.

It should be readily appreciated that the concept of the instant invention is somewhat akin to the manual process previously undertaken. In the prior art, an operator would compare abnormally worn areas of the tire to the remaining areas of the tire. In like manner, the instant invention seeks to generate a reference surface from maximum lateral data points and to compare the curve of the actual data points to the reference so generated. The deviation comprises the degree of irregularity of the tread wear.

It will further be appreciated that all of the data, particularly as present at the end of the operation designated by the numeral 66, can be retained and digitally stored for future analysis. Once this data has been obtained and stored, further retention of the tire is no longer necessary.

Thus it can be seen that the objects of the invention have been satisfied by the structure presented above. While in accordance with the patent statutes only the best mode and preferred embodiment of the invention have been presented and described in detail, it is to be understood that the invention is not limited thereto or thereby. Accordingly, for an appreciation of the true scope and breadth of the invention reference should be made to the following claims.

What is claimed is:

1. Apparatus for measuring and analyzing the tread wear of a pneumatic tire, comprising:
   first means for receiving and rotating a tire about the axis of rotation of the tire;
   second means adjacent the tire for scanning a field of view including a tread surface of the tire and obtaining data from said field of view; and
   control means interconnected between said first and second means for controlling said rotation of the tire and said scanning of said field of view and analyzing said data, said control means measuring and analyzing the tread wear from said data, and wherein said control means controls said first means to index the tire about said axis a set amount between scans of said field of view by said second means, controls said second means to scan said field of view at a fixed rate, and acquires said data from said second means and generates a matrix of data corresponding to discrete points within said field of view.

2. The apparatus according to claim 1, wherein said second means comprises a laser scanner.

3. The apparatus according to claim 1, wherein those data points within said matrix representing said tread surface are identified as an array by said control means.

4. The apparatus according to claim 3, wherein said array of data points representing said tread surface are uniformly laterally and circumferentially spaced in intersecting circumferential and lateral sets of data point.

5. The apparatus according to claim 4, wherein said control means removes a first harmonic of said array of data points representing said tread surface, compensating for out-of-roundness of the tire.

6. The apparatus according to claim 5, wherein said control means removes noise spikes from said array of data points.

7. The apparatus according to claim 6, wherein said control means determines a maximum data point for each of said circumferential sets of data.

8. The apparatus according to claim 7, wherein said control means generates a composite lateral profile from said maximum data points from each of said circumferential sets of data.

9. The apparatus according to claim 8, wherein said control means compares each lateral set of data to said composite lateral profile.

10. The apparatus according to claim 9, wherein said control means determines tread wear from said comparison of said lateral sets of data to said composite lateral profile.

11. The apparatus according to claim 10, wherein said control means generates a visual display of said tread wear.

12. A method for measuring and analyzing the tread wear of a pneumatic tire, comprising:
    indexing the tire about its axis of rotation;
    scanning a data field including the tire and obtaining data from discrete data points within said data field;
    determining those data points defining a tread surface of the tire, said data points defining a matrix of circumferentially and laterally aligned sets of data points; and
    removing a first harmonic from said matrix of data points, compensating for out-of-roundness of the tire.

13. The method according to claim 12, further comprising the step of removing noise spikes from said matrix of data points.

14. The method according to claim 13, further comprising the step of determining a maximum data point for each of said circumferentially aligned sets of data points.

15. The method according to claim 14, further comprising the step of generating a composite profile from said maximum data points from each of said circumferentially aligned sets of data points.

16. The method according to claim 15, further comprising the step of comparing each of said laterally aligned sets of data points with said composite profile.

17. The method according to claim 16, further comprising the step of determining tread wear from said comparison of said laterally aligned sets of data points to said composite profile.

18. The method according to claim 17, further comprising the step of generating a visual display of said tread wear.

* * * * *